Aug. 2, 1949.  M. CASERTA  2,477,720
PRESSURE ADJUSTING DEVICE
Filed April 17, 1944
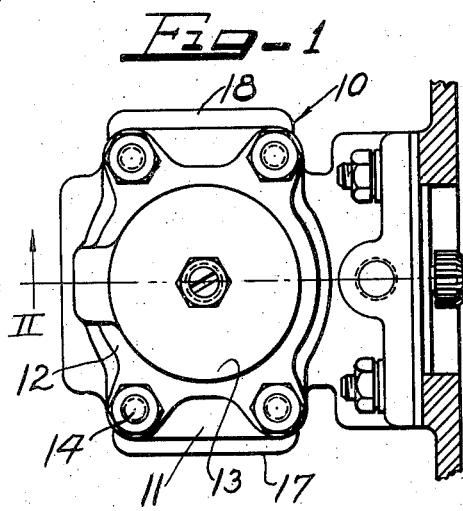
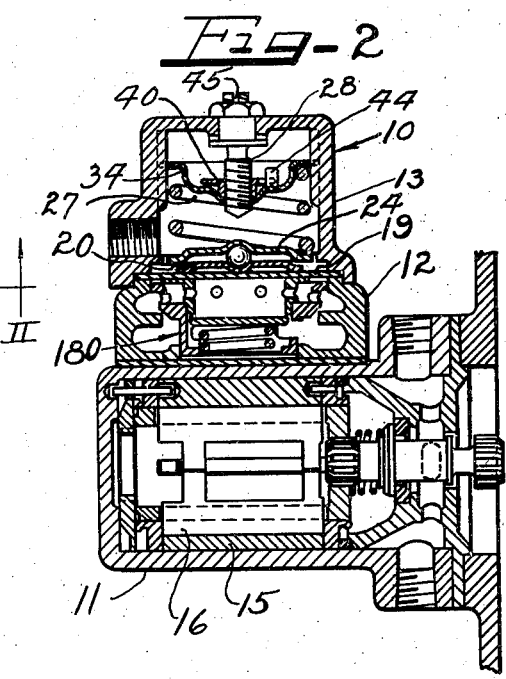
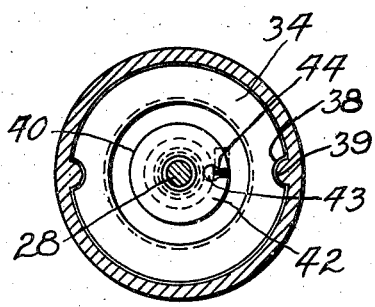
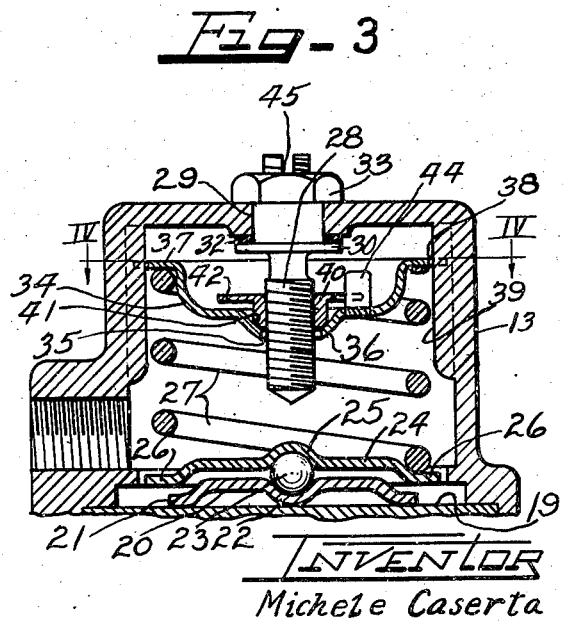
INVENTOR
Michele Caserta
by Charles W. Still Attys Patented Aug. 2, 1949

2,477,720

UNITED STATES PATENT OFFICE 2,477,720

PRESSURE ADJUSTING DEVICE

Michele Caserta, Detroit, Mich.

Application April 17, 1944, Serial No. 531,438

1 Claim. (Cl. 267—1)

This invention relates to a pressure adjusting device and more particularly to such a device for use in a relief and by-pass valve assembly such as employed in pumps for the transfer of fuel in aircraft.

The present invention constitutes an improvement of the diaphragm adjusting device described in my copending application Serial No. 512,891, filed December 4, 1943, now Patent No. 2,375,076, May 1, 1945. The diaphragm adjusting mechanism disclosed in that application includes a pair of washers for confining the spring the pressure of which against the diaphragm is to be adjusted. To effect such adjustments, one of the washers is threaded upon a screw which can be turned to thread the washer therealong. It has been found in practice that with the washer threaded directly upon the adjusting screw, there is a tendency for the coiled spring to transmit other than truly axial forces only. This seems to be due to the fact that as the spring is being compressed or the compression thereon is being lessened, one end or the other of the spring will tend to be deflected and thereby transmit a thrust that is not truly axial.

I have now found that by mounting the spring confining washer freely upon the adjusting screw and providing a nut threaded on the screw and in self-adjusting bearing relationship to the washer, the difficulty experienced in the former type of construction is entirely eliminated. In the present construction both of the spring confining washers have a limited measure of self-adjustabilty, so that as the compression on the spring is increased or diminished, both washers are able to accommodate any deflection that may occur in the spring ends and thus prevent the transmission of any non-axial forces to the diaphragm itself.

It is therefore an important object of this invention to provide a pressure adjusting mechanism in which the spring through which a force is transmitted to a diaphragm is confined between two washers, both of which have a limited degree of self-adjustability to accommodate any tendency of the spring ends to become deflected and thus preventing the transmission to the diaphragm of any but a truly axial force.

Other and further important objects of this invention will be apparent from the disclosures in the specification and the accompanying drawings.

On the drawings:

Figure 1 is a top plan view of a pump with which my pressure adjusting device is illustrated as being associated;

Figure 2 is a sectional view taken substantially along the line II—II of Figure 1, with parts in elevation;

Figure 3 is an enlarged, fragmentary sectional view of the pressure adjusting mechanism shown in Figure 2; and Figure 4 is a sectional view taken substantially along the line IV—IV of Figure 3.

The reference numeral 10 (Figs. 1 and 2) indicates generally an aircraft fuel pump with which a pressure adjusting device of my invention is particularly adapted to be associated. Said pump 10 comprises a pump casing 11, a valve housing 12 mounted thereon and valve housing cover 13 secured to said housing 12 and to the pump casing 11 by means of bolts and nuts 14. The pump here illustrated is of the rotary vane type, the bore of the pump casing 11 being provided with a pump liner 15 within which a rotor 16 is adapted to be driven. The pump casing 11 is provided with an intake 17 and an outlet 18 for connecting the pump in a fuel line to an engine, or other point to which fuel is to be delivered.

Since the construction of the pump proper forms no part of the instant invention and is already described in my copending applications Serial Nos. 397,763, filed June 12, 1941, now Patent No. 2,353,545, July 11, 1944, and 512,891, filed December 4, 1943, no detailed description of the pump construction is necessary here. It is sufficient merely to point out that a relief and by-pass valve assembly, indicated generally by the reference numeral 180 (Fig. 2) is adapted to be assembled within the valve housing 12, and that between said valve housing and said cover 13 therefor there is peripherally clamped a flexible diaphragm 19, which bears directly against the upper edge of said valve assembly 180.

A stamped metal washer 20 is above said diaphragm 19 to rest thereagainst with its downwardly offset peripheral portion 21 in contact with said diaphragm 19. Said disk 20 is further formed with a semi-spherical, centrally depressed portion 22 for receiving a ball 23. A second stamped metal disk 24 is formed with a complementary semi-spherical portion 25 which partially receives said ball 23 to be centered thereby. Said disk 24 is also provided with a downwardly offset peripheral flange 26 which forms a seat for the bottom turn of a regulating spring 27 for adjusting the pressure against said diaphragm 19.

The diaphragm adjusting and pressure regulating mechanism includes a screw 28, which is adapted to extend through an opening 29 centrally positioned in the top of said cover 13. Said screw 28 is provided with an integral collar 30, between which and the underside of the cover 13 is positioned a gasket 32. A check nut 33 serves to draw the collar 30 and gasket 32 tightly up against the under surface of the top wall of said cover 13 to provide a fluid-proof seal. A disk washer 34 is centrally apertured as at 35 for permitting the free passage therethrough of said screw 28. The washer 34 is provided with a segmental spherical portion 36 surrounding said aperture 35 and with an outwardly extending peripheral flange 37. Said flange 37 is slotted as at 38 to permit the entry thereinto of longitudinally extending ribs 39 formed on the inside of the wall of said cover 13. The provisions of the slots 38 and ribs 39 prevents the turning of said washer 34 relatively to the valve housing cover 13. The outer peripheral flange 37 affords a seat for the upper end of said spring 27.

A nut 40 is threadingly mounted upon said screw 28 for movement therealong as said screw 28 is turned. Said nut 40 is provided with a lower end 41 which is tapered or formed with a radius to serve as a bearing face in contact with the segmental spherical portion 36 of said washer 34. Owing to the segmental spherical curvature of said portion 36 and the fact that the washer aperture 35 is sufficiently large to provide a clearance about the shank of the screw 28, said washer 34 has a limited amount of self-adjustment through tilting movement relative to said screw 28. The nut 40 is also provided with an outwardly extending peripheral flange 42, one edge of which is slotted as at 43 (Fig. 4).

A tang 44 is struck up from the washer 34 and the nut 42 and washer 34 so positioned that said tang 44 extends through the slot 43. The interengagement of the tang 44 with the sides of the slot 43 prevents relative rotation between the nut 40 and the washer 34.

In order to permit external adjustment of the adjusting and regulating mechanism just described, the screw 28 is provided at its upper exposed end with a screwdriver slot 45. Upon loosening the lock nut 33 slightly, the operator can turn the screw 28 by inserting a screwdriver in the slot 45 and thereby effect the desired adjustment. If the screw 28 is turned in one direction, the nut 40 is caused to move downwardly therealong to effect a greater compression of the spring 27, while if the screw is turned in the opposite direction the nut 40 is caused to move upwardly to lessen the compression upon the spring 27. The provision of the segmental bearing surface of the portion 36 and of the tapered portion 41 of the nut 40 permits, as previously indicated, a certain amount of self adjustment of the washer 34 to accommodate any tendency of the upper end of said spring 27 to become deflected as the spring is either compressed or allowed to expand. Similarly, the ball 23 between the disks 20 and 24 permits the disk 24 to have a limited amount of self-adjustability to accommodate any deflection of the lower end of said spring 27. By virtue of these provisions, truly axial forces only are transmitted from said spring and washer assembly through the ball 25 to the lower disk 20 and thereby to the diaphragm 19. All other components of the forces set up by the compression placed upon the spring 27 are dissipated or neutralized by the ability of the washer 34 and disk 24 to adjust themselves to accommodate all non-axial components of such forces.

The diaphragm 19 may thus be placed under the desired amount of pressure to cause the relief valve in the by-pass relief valve assembly 180 to operate satisfactorily under the varying conditions to which it may be subjected.

It will thus be observed that I have provided an improved pressure regulating and adjusting mechanism that is capable of delicate adjustment to give exactly the desired pressure upon the diaphragm and one in which all but truly axial components of the forces set up are either dissipated or neutralized by virtue of the self-adjusting features of the washers that serve to confine the spring.

It will, of course, be understood that various details of construction may be varied through a wide range without departing from the principles of this invention and it is, therefore, not the purpose to limit the patent granted hereon otherwise than necessitated by the scope of the appended claim.

What I claim is:

In a spring urged diaphragm assembly including an inverted cup-shaped casing, means for adjusting the pressure of the spring comprising a shouldered rod having an upper end extending rotatably through the top of said casing axially thereof with the shoulder thereof engaging the underside of said casing top and having a threaded end within said casing, the internal wall of said casing having longitudinally extending opposed ribs, a centrally apertured washer freely mounted on said rod for confining one end of said spring, said washer having an upwardly concave segmental spherical portion surrounding said aperture and having an upper peripheral flange portion slotted to receive said ribs to prevent relative rotation of said washer with respect to said casing, and a nut threaded on said rod and having a lower convex end face for bearing against said segmental spherical portion to provide swivelling and tilting movement therebetween, said nut having a peripheral slotted flange and said washer having a tang struck therefrom and extending into the slot of said flange to prevent relative rotation of said nut and washer, while providing for relative tilting action therebetween, whereby by turning said rod said nut acts through said washer to adjust the compression of said spring, said convex nut end face and said segmental spherical portion providing self-adjustment of said washer under the reaction thereagainst of said spring.

MICHELE CASERTA.

REFERENCES CITED

The following references are of record in the file of this patent:

UNITED STATES PATENTS

| Number | Name | Date |
| --- | --- | --- |
| 303,252 | Ashton | Aug. 12, 1884 |
| 1,863,075 | Terry | June 14, 1932 |
| 2,170,530 | Johnson | Aug. 22, 1939 |

FOREIGN PATENTS

| Number | Country | Date |
| --- | --- | --- |
| 492,878 | Great Britain | Sept. 28, 1938 |
| 677,032 | Germany | June 17, 1939 |